(Specimens.)

F. S. SHIRLEY.
MANUFACTURE OF GLASS AND ARTICLES THEREFROM.

No. 332,294. Patented Dec. 15, 1885.

Witnesses:
Lillie O. Shirley.
Henry Weber.

Inventor.
Fredk. S. Shirley

UNITED STATES PATENT OFFICE.

FREDERICK STACEY SHIRLEY, OF NEW BEDFORD, MASS.

MANUFACTURE OF GLASS AND ARTICLES THEREFROM.

SPECIFICATION forming part of Letters Patent No. 332,294, dated December 15, 1885.

Application filed September 30, 1885. Serial No. 178,637. (Specimens.)

*To all whom it may concern:*

Be it known that I, FREDERICK S. SHIRLEY, a citizen of the United States, residing at New Bedford, in the county of Bristol and State of Massachusetts, have invented certain new and useful Improvements in the Manufacture of Glass and Articles Therefrom, of which the following is a specification, reference being had to the accompanying drawings.

My invention and discovery consist, first, in a new mixture for glass, whereby I produce a new translucent glass, which, when formed into articles, shows entirely new and beautiful effects; secondly, in new articles of manufacture from such glass; thirdly, in applying certain finishes to same, as more fully described hereinafter.

Figure 1:
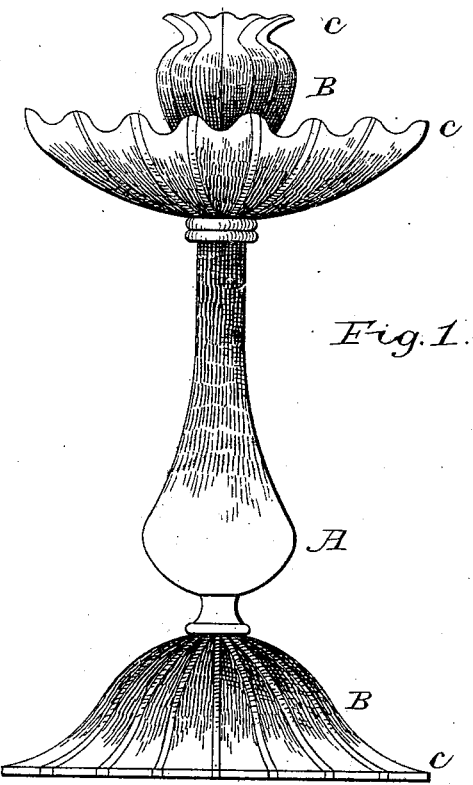
Figure 2:
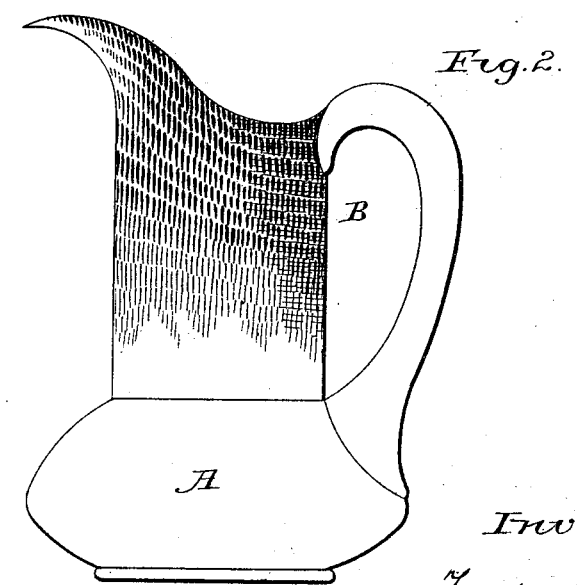

Figures 1 and 2 of the accompanying drawings illustrate the articles.

A A show the original yellow or body color; B B B, the developed color. *c c c* show the points where the reheating has reproduced the original body-color.

To carry out my invention I take one of the regular glass mixtures technically known as "lead" or "flint" glass consisting, say, of one hundred (100) pounds avoirdupois white sand, thirty-six (36) pounds refined lead oxide, twenty-five (25) pounds of pearl ashes, five (5) pounds bicarbonate of soda, seven (7) pounds of niter. I make this translucent in any usual way, say, by adding six (6) pounds of fluor-spar and five (5) pounds of feldspar. This batch produces a well-known mixture for translucent or opal glass, and my new mixture consists in a batch of this sort, to which both gold and uranium, or its described equivalents, are added, whereby a new glass is produced, as more fully described below. To a batch such as above described I usually use two pounds avoirdupois of oxide of uranium and one and one-half pennyweights of prepared gold, the whole to be thoroughly mixed and melted in the usual manner known to the art. The proportions above mentioned may be varied, if desired, or equivalents substituted without departing from the spirit of my invention and discovery, which is the combination of the oxide of uranium with prepared gold, added to glass mixtures containing alumina, or its equivalent, when compounded, so as to form a translucent glass—for example, the fluor-spar and feldspar (both of which contain alumina) may be omitted and cryolite and kaolin (which also contain alumina) substituted in equivalent proportions, care being taken to prevent the body being made too dense.

Articles of glassware when made from this melted mixture will have a beautiful sulphur-yellow color throughout when first formed, but in finishing same in the usual manner in which such articles are made the metal or material will develope a delicate pink shade on the portions last finished, this color shading into the original yellow body-color. Should it be desired, the workman by reheating the edges to a melting-point, can restore the original yellow color on the part so reheated, thus producing varied effects of color-shadings not previously obtainable.

My invention is the specific combination of a distinctive coloring agent—such as oxide of uranium with prepared gold—and adding same to glass mixtures, which form a translucent glass body and contain alumina, or its equivalents, this last-named material having a special effect on mixtures containing gold, controlling the sensitive action of its coloring property in a marked degree. One peculiarity of my mixture, when melted, is that where the color is once developed on the article it is not sensitive to change from subsequent reheatings, unless the heat is carried to such a high degree as to partially melt the glass, and another peculiarity is that the pink or developed color by such increased heat can be reduced, and the part so reheated to its original yellow color, the workman taking care to keep the article in form by using his tools in the usual manner. The tint of yellow may be varied materially from a very pale primrose with a slight greenish tint to a deep sulphur yellow by increasing or diminishing the uranic oxide, and the pink or developed color may be varied in like manner from a pale salmon color to a deep rose by adding to or decreasing the proportion of gold; but, if the latter is increased too much, the shades of color will not be so delicate, and it will prevent the reaction of the developed color to its original body color. Carbonate of copper or oxide of chrome, combined with litharge, may be used in lieu of the oxide of uranium with the prepared gold, and the above described translucent glass mixture and beautiful translucent glassware of other colors shading into each other can be produced, and combination of other oxides with the uranium and gold would give still other varieties of color, the first-named carbonate of copper producing ware of delicate greens to pale blue, (shade of color being dependent on quantity used,) bodies shading purple and rose color, that is developed in the finishing. The chrome oxide and litharge produce a shade of yellowish green, shading into a maroon or purple. When the mixture is melted in the pot, the workman will gather sufficient metal on his blow-iron to form the article desired, and proceeds in identically the same manner well known to the art and as if making the same-shaped article from ordinary flint-glass, and without any care or effort on his part the shaded effects described will be produced, and the article, when finished, will be annealed in the usual manner. I also produce a new and beautiful effect on this ware by removing the skin or glazing from the surface of the article, either entirely or in parts only of the same, by abrading same with a sand-blast or immersing the articles in a bath suitable for that purpose. When desirable to retain the glaze on any portion, such parts are to be protected by a suitable cover or shield, or covered with wax or varnish, and the articles of this glass can be further ornamented by enamel colors, its resistance to heat without change of color rendering it specially adaptable for this purpose, as enamel colors require a high heat to flux them. When carbonate of copper is used, the best proportion is nine ounces; for chrome and litharge, two ounces green oxide of chrome and ten pounds of litharge well mixed with same, and it will also need an increase in amount of gold. The effects can be varied, as will be understood, by using a mixture of these coloring-agents.

I am well aware of the so-called "opalescent mixtures" that change in the working, and which contain bone-ash and also tin, in combination with arsenic, and that the same have been combined with coloring-oxides to produce whites, greens, and blues. Most of these have a flinty appearance with opalescent tints, and when reheated develop shaded colors from the body-color to a white, the developed color being more or less opaque. These all turn in the working by cooling and reheating the article, and are all well known to the art for many years. I do not claim these; nor do I include manganese, which is frequently used as a corrector in all glass mixtures, in the term "distinctive coloring-oxides," for although, if used in excess, it would give a body-color it would not be suitable for practical use with gold, and is not the equivalent, practically, of uranium, copper, or chrome and lead, and would not produce a color in contrast with that developed from the gold, and is well known for many years to have been used in combination with gold in coloring glass.

I am aware of the patents granted to Joseph Locke, dated July 24, 1883, and numbered 282,002, and of November 3, 1883, and numbered 288,582, and do not claim any of these inventions in this application.

Having described my invention, what I claim is—

1. A mixture for glass in which uranium oxide or its described equivalent coloring agents and prepared gold are both added to glass batch containing alumina or its equivalents, for producing a translucent glass, substantially as described.

2. A mixture for producing colored translucent glassware, in which prepared gold and two or more distinctive coloring agents are used, in combination with alumina or its equivalents, substantially as specified.

3. As a new article of manufacture, an article of glassware of a translucent material having a body-color due to a coloring agent such as is above described, and a developed color shading into the original body-color, substantially as described.

4. As a new article of manufacture, an article of glassware formed from translucent material having a body-color due to a coloring agent such as is above described, and a developed color shading into the original body-color and having a roughened or lusterless surface, substantially as described.

5. As a new manufacture, an article of glassware having one portion of a given color or tint shading into another color or tint, and having a roughened or lusterless surface, similar to a peach-skin, substantially as shown and described.

In testimony whereof I affix my signature in presence of two witnesses.

FREDK. STACEY SHIRLEY.

Witnesses:
ANDREW SNOW, Jr.,
CHAS. F. SWIFT.